(12) United States Patent
Barnett et al.

(10) Patent No.: US 12,265,702 B2
(45) Date of Patent: Apr. 1, 2025

(54) SYSTEMS AND METHODS FOR EFFICIENT MULTIMODAL INPUT COLLECTION WITH MOBILE DEVICES

(71) Applicant: Google LLC, Mountain View, CA (US)

(72) Inventors: Donald A. Barnett, Monroe, WA (US); Corbin Alexander Cunningham, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/546,531

(22) PCT Filed: Apr. 28, 2021

(86) PCT No.: PCT/US2021/029599
§ 371 (c)(1),
(2) Date: Aug. 15, 2023

(87) PCT Pub. No.: WO2022/231581
PCT Pub. Date: Nov. 3, 2022

(65) Prior Publication Data
US 2024/0094895 A1  Mar. 21, 2024

(51) Int. Cl.
*G06F 3/0488* (2022.01)
*G06F 21/32* (2013.01)

(52) U.S. Cl.
CPC ............ *G06F 3/0488* (2013.01); *G06F 21/32* (2013.01)

(58) Field of Classification Search
CPC ...... G06F 3/0488; G06F 21/32; G06F 3/0484; G06F 3/0481; G06K 9/00
See application file for complete search history.

(56) References Cited

U.S. PATENT DOCUMENTS

| | | | |
|---|---|---|---|
| 2016/0364600 A1 | 12/2016 | Shah et al. | |
| 2017/0104861 A1* | 4/2017 | Kang | G06V 40/172 |
| 2018/0279050 A1* | 9/2018 | Ryu | H04L 67/12 |
| 2018/0336226 A1 | 11/2018 | Anorga et al. | |
| 2019/0058834 A1* | 2/2019 | Kim | G06F 1/3231 |
| 2020/0349262 A1* | 11/2020 | Seo | G06F 21/602 |
| 2021/0271359 A1* | 9/2021 | Mine | G06F 3/0484 |
| 2021/0409539 A1* | 12/2021 | Arellano | G06F 1/1684 |

FOREIGN PATENT DOCUMENTS

| | | |
|---|---|---|
| EP | 2631843 | 8/2013 |
| EP | 3528173 | 8/2019 |

OTHER PUBLICATIONS

International Search Report for Application No. PCT/US2021/029599, mailed on Jan. 17, 2022, 3 pages.

(Continued)

*Primary Examiner* — Michael A Faragalla
(74) *Attorney, Agent, or Firm* — Shumaker & Sieffert, P.A.

(57) ABSTRACT

Systems and methods are provided for multimodal input collection. More particularly, the present disclosure relates to efficient and intuitive multimodal input collection for mobile devices. As an example, a mobile computing system (e.g., a smartphone, a tablet, a wearable device, etc.) can display a lock screen interface at a display device associated with the mobile computing system (e.g., an initial interface that requests interaction and/or authentication from the user before granting access to applications, etc.).

20 Claims, 10 Drawing Sheets

(56) References Cited

OTHER PUBLICATIONS

International Preliminary Report on Patentability for Application No. PCT/US2021/029599, mailed Nov. 9, 2023, 9 pages.
Notice of Intent to Grant and Text Intended to Grant from counterpart European Application No. 21725954.8 dated Jul. 5, 2024, 58 pp.
Response to Communication Pursuant to Rules 161(1) and 162 EPC dated Aug. 11, 2023, from counterpart European Application No. 21725954.8, filed Feb. 21, 2024, 29 pp.

* cited by examiner

SYSTEMS AND METHODS FOR EFFICIENT MULTIMODAL INPUT COLLECTION WITH MOBILE DEVICES

PRIORITY CLAIM

This application is based upon and claims the right of priority under 35 U.S.C. § 371 to International Application No. PCT/US2021/029599 filed on Apr. 28, 2021, which is incorporated by reference herein.

FIELD

The present disclosure relates generally to multimodal input collection. More particularly, the present disclosure relates to efficient and intuitive multimodal input collection for mobile devices.

BACKGROUND

Mobile communication devices (e.g., smartphones, etc.) have become increasingly important tools for consumers in both business and personal settings. Often, users desire to capture and record information in response to time-sensitive events (e.g., quickly capturing an image of a restaurant menu, capturing video of an event as it occurs, etc.). However, to do so, a user is conventionally required to navigate a series of time-consuming user interfaces and applications to initiate capture of the information (e.g., navigating through a lock screen, opening a camera application, switching to a video recording mode in the camera application, etc.). As such, systems and methods that provide efficient multimodal input collection for mobile devices are desired.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for contextualized input collection and intent determination for mobile devices. The method includes providing, by a mobile computing system comprising one or more computing devices, a lock screen interface associated with the mobile computing system, wherein the lock screen interface comprises an input collection element configured to cause capture of sensor data while selected. The method includes obtaining, by the mobile computing system from a user of the mobile computing system, an input signal that selects the input collection element. The method includes, in response to obtaining the input signal, capturing, by the mobile computing system, the sensor data from a plurality of sensors of the mobile computing system, wherein the plurality of sensors comprises an audio sensor and one or both of a front image sensor or a rear image sensor. The method includes determining, by the mobile computing system based at least in part on the sensor data from the plurality of sensors, one or more suggested action elements from a plurality of predefined action elements, wherein the one or more suggested action elements are respectively indicative of one or more device actions. The method includes providing for display, by the mobile computing system at a display device associated with the mobile computing system, the one or more suggested action elements within the lock screen interface.

Another example aspect of the present disclosure is directed to a mobile computing system. The mobile computing system includes one or more processors. The mobile computing system includes a plurality of sensors, including: one or more image sensors comprising one or more of a front image sensor, a rear image sensor, or a peripheral image sensor; and an audio sensor. The mobile computing system includes a display device. The mobile computing system includes one or more tangible, non-transitory, computer readable media that collectively store instructions that when executed by the one or more processors cause the one or more processors to perform operations. The operations include providing a lock screen interface associated with the mobile computing system, wherein the lock screen interface comprises an input collection element configured to cause capture of sensor data while selected. The operations include obtaining, from a user of the mobile computing system, an input signal that selects the input collection element. The operations include, in response to obtaining the input signal, capturing the sensor data from the plurality of sensors of the mobile computing system. The operations include determining, based at least in part on the sensor data from the plurality of sensors, one or more suggested action elements from a plurality of predefined action elements, wherein the one or more suggested action elements are respectively indicative of one or more device actions. The operations include providing for display, at the display device, the one or more suggested action elements within the lock screen interface.

Another example aspect of the present disclosure is directed to one or more tangible, non-transitory, computer readable media that collectively store instructions that when executed by one or more processors cause the one or more processors to perform operations. The operations include providing a lock screen interface associated with the mobile computing system, wherein the lock screen interface comprises an input collection element configured to cause capture of sensor data while selected. The operations include obtaining, from a user of the mobile computing system, an input signal that selects the input collection element. The operations include in response to obtaining the input signal, capturing the sensor data from a plurality of sensors of the mobile computing system, wherein the plurality of sensors comprises an audio sensor and one or both of a front image sensor or a rear image sensor. The operations include determining, by the mobile computing system based at least in part on the sensor data from the plurality of sensors, one or more suggested action elements from a plurality of predefined action elements, wherein the one or more suggested action elements are respectively indicative of one or more device actions. The operations include providing for display, at a display device associated with the mobile computing system, the one or more suggested action elements within the lock screen interface.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
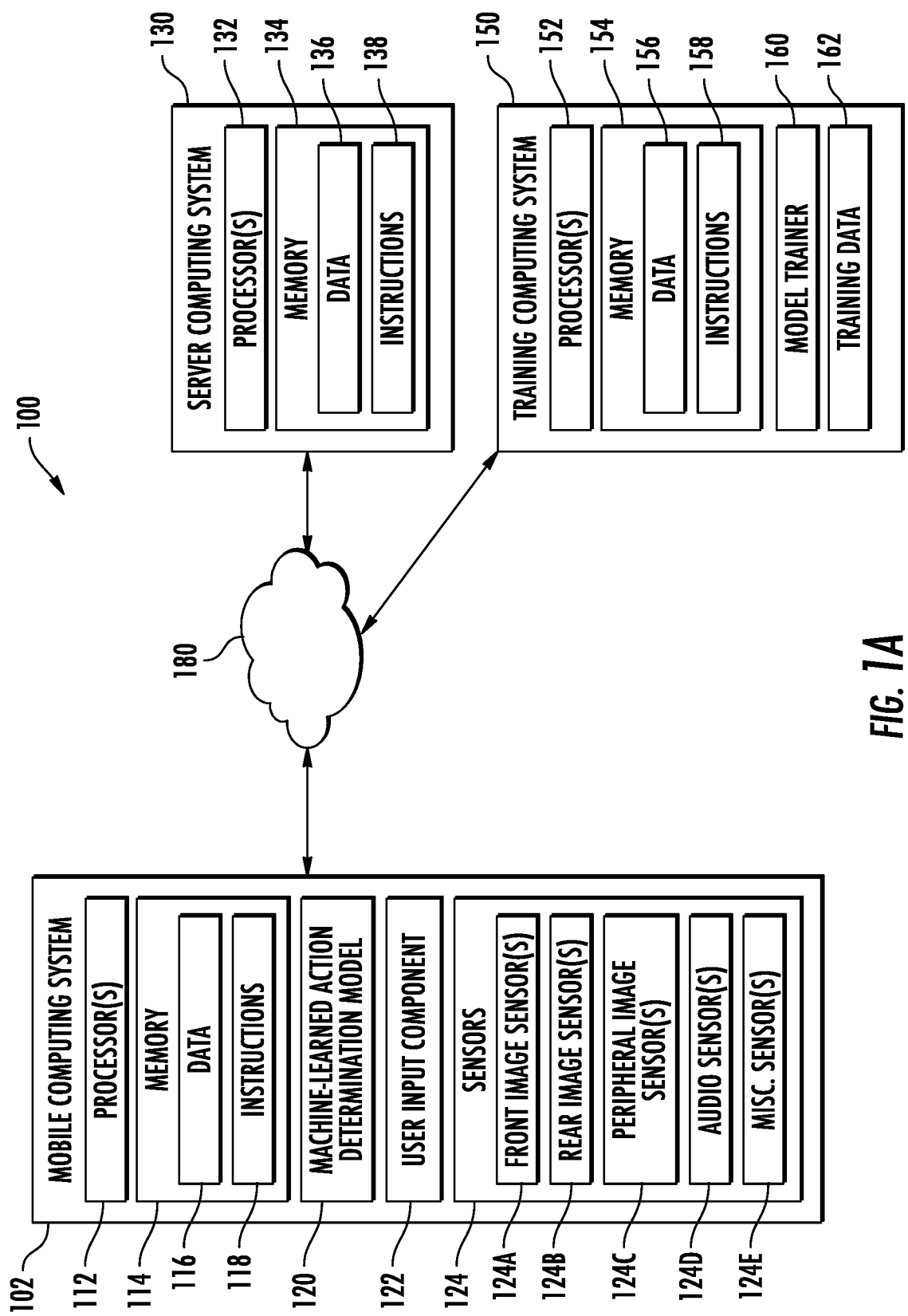
FIG. 1A depicts a block diagram of an example computing system that performs efficient input signal collection according to example embodiments of the present disclosure.

Reference numerals that are repeated across plural figures are intended to identify the same features in various implementations.

DETAILED DESCRIPTION

Overview

Generally, the present disclosure is directed to multimodal input collection. More particularly, the present disclosure relates to efficient and intuitive multimodal input collection for mobile devices. As an example, a mobile computing system (e.g., a smartphone, a tablet, a wearable device, etc.) can display a lock screen interface at a display device associated with the mobile computing system (e.g., an initial interface that requests interaction and/or authentication from the user before granting access to applications, etc.). The lock screen interface can include an input collection element that, once selected, is configured to begin capture of sensor data from sensors of the mobile computing system. The mobile computing system can obtain an input signal from a user that selects the input collection element (e.g., providing a touch gesture at the location of the input collection element, providing a voice command, moving the mobile computing system in a certain manner, etc.). In response to obtaining the input signal, the mobile computing system can capture sensor data from a plurality of sensors (e.g., an audio sensor, a front image sensor, a rear image sensor, a peripheral image sensor, etc.). Based on the sensor data, one or more suggested action elements can be determined (e.g., using machine-learned model(s), etc.) from a plurality of action elements. Each of the suggested action element(s) can be indicative of a respective device action (e.g., delete recorded data, save recorded data, open application(s), share recorded data, view recorded data, etc.). Once determined, the suggested action element(s) can be displayed within the lock screen interface. In such fashion, a user can near-instantaneously record multimodal input data, therefore allowing the user to react to real-time events quickly and efficiently as they unfold (e.g., recording video of a situation in real-time, quickly generating a reminder, etc.).

More particularly, a mobile computing system lock screen interface can be displayed at a display device associated with the mobile computing system (e.g., a touch screen display device, etc.). The lock screen interface can be or otherwise include an interface that requests interaction and/ or authentication from a user before granting access to a separate interface of the mobile computing system. More particularly, the lock screen interface can generally be understood to be an interface first provided to the user after the mobile computing system exits a rest state. As an example, the mobile computing system can be in a "rest" state in which the display device associated with the mobile computing system is not active (e.g., a "sleep" mode, etc.). The mobile computing system can exit the rest state based on a certain stimulus (e.g., a certain movement of the mobile computing system, pressing a button on the mobile computing system, touching the display device of the mobile computing system, receiving notification data for an application executed at the mobile computing system, etc.) and can activate the display device associated with the mobile computing system. Once the display device has been activated, the lock screen interface can be displayed at the display device.

In other implementations, the lock screen interface can include a blank or non-illuminated screen. As an example, in the case of OLED screens for instance, the device can open the gate to input signals directly from the rest state. This shortcuts the need to "wake" to an illuminated lock screen interface. In other words, the device can start input by for instance touching the display screen in the lower third of the device and immediately starting to talk or record with the camera, or both.

In some implementations, the lock screen interface may request authentication data from a user (e.g., fingerprint data, facial recognition data, password data, etc.). Additionally, or alternatively, in some implementations, the lock screen interface may request an input signal from a user (e.g., a slide gesture on an "open screen" action element, a movement of the mobile computing system, pressing a physical button of the mobile computing system, a voice command, etc.). As an example, the lock screen interface can include an authentication collection element. The authentication collection element can indicate a certain type of authentication data to be collected, and can also indicate a status of the collection of the authentication data. For example, the authentication collection element can be an icon representative of a fingerprint (e.g., overlaid on a location of a segment of the display device configured to collect fingerprint data, etc.), and the authentication collection element can be modified to indicate whether the authentication data has been collected and/or accepted (e.g., changing the icon from a red color to a green color upon successful authentication of biometric data, etc.).

In some implementations, the user may be required to complete the authentication to access the suggested actions. In other implementations, the user may not be required to complete the authentication to access the suggested actions. Providing the proposed features as part of a lock screen interface can have the advantage that the lock screen is the first screen that the user is presented with when they pick up their device, and so having this functionality in the lock screen means there is one less screen to go through in order to access the desired actions/applications.

The lock screen interface can include an input collection element. The input collection element can be configured to capture multimodal sensor data while the input collection element is selected. The input collection element can be an icon or other representation that can be selected by the user. As an example, the input collection element can be an icon that indicates the initiation of multimodal input collection when selected. In some implementations, the input collection element can include or otherwise represent a preview of the multimodal sensor data to be collected. As an example, the input collection element can include or otherwise represent a preview of what an image sensor of the camera is currently capturing. For example, a rear image sensor of the mobile computing system can periodically capture image data (e.g., every two seconds, periodically when the mobile computing system is moved, etc.). The captured image data can be included as a thumbnail within the input collection element. As another example, the input collection element may include an audio waveform symbol indicative of audio data currently being captured by an audio sensor of the mobile computing system. In such fashion, the input collection element can indicate to a user that interaction with the input collection element can initiate multimodal data collection, and can also indicate a preview of what data would be collected upon selection of the input collection element (e.g., a preview of what the image sensor(s) would currently capture, etc.).

In some implementations, the input collection element can be selected for a period of time, and can be configured to capture sensor data for that period of time. As an example, the input collection element can be configured to be selected via a touch gesture or a touch-and-hold gesture (e.g., placing a finger at the location of the input collection element and holding the finger at that location for a period of time, etc.). If selected via the touch gesture, the input collection element can capture sensor data for that instant of time corresponding to the touch gesture or can capture sensor data for a predetermined amount of time (e.g., two seconds, three seconds, etc.). If selected via the touch-and-hold gesture, the input collection element can capture sensor data for the amount of time that the touch-and-hold gesture is provided (e.g., recording video and audio data for as long as a user touches the input collection element, etc.).

The mobile computing system can obtain an input signal from a user of the mobile computing system that selects the input collection element. As an example, the input signal can be a touch gesture or a touch-and-hold gesture at the location of the input collection element as displayed on the display device. It should be noted that the input signal is not necessarily required to be a touch gesture. Rather, the input signal can be any type or manner of input signal from the user that selects the input collection element. As an example, the input signal can be a voice command from the user. As another example, the input signal can be a movement of the mobile computing system by the user. As another example, the input signal can be a gesture performed by the user and captured by an image sensor of the mobile computing system (e.g., a hand gesture performed in front of the front image sensor of the mobile computing system, etc.). As another example, the input signal can be or otherwise include a plurality of input signals from the user. For example, the input signal may include a movement of the mobile computing system and a voice command from the user.

In some implementations, the type of sensor data collected can be based at least in part on the type of input signal obtained from the user. As an example, if the input signal is or otherwise includes a touch gesture (e.g., briefly touching the location of the input collection element on the display device, etc.), the input collection element can collect a single image using image sensor(s) (e.g., a front image sensor, a rear image sensor, a peripheral image sensor, etc.). If the input signal is or otherwise includes a touch-and-hold gesture (e.g., placing a finger at the location of the input collection element and holding the finger at that location for a period of time, etc.), the input collection element can collect video data (e.g., a plurality of image frames) for as long as the touch-and-hold input signal is maintained. In such fashion, the input collection element can provide the user precise control over the type and/or duration of the input signal that is collected from the sensors of the mobile computing system.

In some implementations, preliminary sensor data can be collected for a period of time before obtaining the input signal that selects the input collection element. More particularly, preliminary sensor data (e.g., image data, etc.) can be continuously collected and updated so that the preliminary sensor data collected over a period of time can be appended to the sensor data collected after the input collection element is selected. As an example, the mobile computing system can continuously capture the last five seconds of preliminary image data before the input collection element is selected. The five seconds of preliminary image data can be appended to the sensor data collected after the input collection element was selected. In such fashion, in the case of a real-time, quickly-occurring event, the user can access sensor data even if the user was not fast enough to select the input collection element in time to capture the real-time event. Additionally, in some implementations, the input collection element can include at least a portion of the preliminary sensor data (e.g., image data, etc.). As an example, the preliminary sensor data can include image data. The image data can be presented within the input collection element (e.g., depicted within the center of the input collection element, etc.). In such fashion, the input collection element can act as a preview to the user of what image data would be collected if the user were to select the input collection element.

In response to obtaining the input signal, the mobile computing system can capture the sensor data from a plurality of sensors of the mobile computing system. The plurality of sensors can include any conventional or future sensor devices included within mobile computing system(s) (e.g., image sensor(s), audio sensor(s), accelerometer(s), GPS sensor(s), LIDAR sensor(s), infrared sensor(s), ambient light sensor(s), proximity sensor(s), biometric sensor(s), barometer(s), gyroscope(s), NFC sensor(s), ultrasound sensor(s), etc.). As an example, the mobile computing system can include a front image sensor, a rear image sensor, a peripheral image sensor (e.g., an image sensor positioned about the edge of the mobile computing system and perpendicular to the front and rear image sensor(s), etc.), and an audio sensor. In response to obtaining the input signal the mobile computing system can capture the sensor data from the front image sensor and the audio sensor. As another example, the mobile computing system can include an audio sensor, a rear image sensor, and a LIDAR sensor. In response to obtaining the input signal, the mobile computing system can capture sensor data from the rear image sensor, the audio sensor, and the LIDAR sensor.

Based at least in part on the sensor data from the plurality of sensors, one or more suggested action elements can be determined from a plurality of predefined action elements. The one or more action elements can be or otherwise include elements that can be selected by the user of the mobile computing system. More particularly, each of the one or more suggested action elements can be indicative of a respective device action, and can be configured to execute the respective device action when selected.

The suggested action element(s) can be elements that can be selected by the user of the mobile computing system. As an example, the suggested action element(s) can be interface elements displayed on the display device (e.g., touch icon(s), etc.), and can be selected by the user with a touch gesture. As another example, the suggested action element(s) can be or otherwise include descriptive text, and can be selected by the user with a voice command. As yet another example, the suggested action element(s) can be icons indicative of a pattern of movement, and can be selected by the user by replicating the pattern of movement with the mobile computing system. For example, a suggested action element may be configured to share data with a separate user in proximity to the user, and the suggested action element may be indicative of a "shaking" motion (e.g., a hand grasping a mobile computing system that indicates the mobile computing system is being shaken, etc.). If the user replicates the pattern of movement (e.g., shakes the mobile computing system, etc.), the data can be shared to the separate user.

The one or more suggested action elements can be indicative of one or more respective device actions. The device actions(s) can include actions that can be performed by the mobile computing system using the captured sensor data (e.g., storing the data, displaying the data, editing the data, sharing the data, deleting the data, transcribing the data, providing the sensor data to an application, opening an application associated with the data, generating instructions for an application based on the data, etc.). As an example, the captured data can include image data. Based on the image data, a suggested action element can be determined that is indicative of a device action to share the image data with a second user. To follow the previous example, a second suggested action element can be determined that is indicative of a device action to open an application that can utilize the image data (e.g., a social networking application, a photo editing application, a messaging application, a cloud storage application, etc.). As another example, the captured data can include image data depicting a scene and audio data. The audio data can include a vocalization of an application name by the user. A suggested action element can be determined that is indicative of a device action to execute the application of the vocalized application name. As another example, the captured data can include image data depicting a scene and audio data. The audio data can include a vocalization of virtual assistant command by the user. A suggested action element can be determined that is indicative of a device action to provide the sensor data to the virtual assistant. In response, the visual assistant application can provide additional suggested action element(s) to the user based on the sensor data (e.g., search results for captured image data, search results for a query included in captured audio data, etc.).

Each of the one or more suggested action elements can be selected from a plurality of predefined action elements. To follow the previous example, each of the previously described action elements can be included in the plurality of predefined action elements (e.g., copying data, sharing data, opening a virtual assistant application, etc.). Based on the sensor data, the one or more suggested action elements can be selected from the plurality of predefined action elements.

The one or more suggested action elements can be displayed at the display device of the mobile computing system within the lock screen interface. As an example, the suggested action elements can be or otherwise include icon(s) that are selectable by the user (e.g., via a touch gesture at the display device, etc.). The icon(s) can be displayed in the lock screen interface of the display device (e.g., above the input collection element, below the input collection element, about the input collection element, etc.).

In some implementations, an input signal can be obtained from the user that selects a suggested action element of the one or more suggested action elements. In response, the mobile computing system can perform the device action indicated by the suggested action element. As an example, a suggested action element indicative of a virtual assistant application can be displayed within the lock screen interface at the display device. The input signal from the user can select the suggested action element (e.g., via a touch gesture, voice command, movement input, etc.). The mobile computing system can execute the virtual assistant application and provide the sensor data to the virtual assistant application. It should be noted that the suggested action element can be selected in an identical or substantially similar manner as previously described with regards to the input collection element.

In some implementations, the mobile computing system may cease displaying the lock screen interface, and instead display an interface corresponding to the virtual assistant application at the display device. Alternatively, in some implementations, the mobile computing system may determine and display additional suggested action element(s) in response to providing the sensor data to the virtual assistant application. As an example, the sensor data can be provided to the virtual assistant application in response to the user selecting a suggested action element indicative of the virtual assistant application. The virtual assistant application can process the sensor data and generate an output (e.g., processing image data depicting textual content and generating search results based on the textual content. One or more additional suggested action elements can be displayed within the lock screen interface based on the output of the virtual assistant application (e.g., providing a suggested action element indicative of mapping data associated with the sensor data, etc.). For example, if the sensor data includes a query, the suggested action elements based on the output data may be or otherwise include results responsive to the query. For another example, if the sensor data includes audio data, the suggested action element(s) based on the output data may be or otherwise depict a transcription of the audio data (e.g., a textual transcription displayed over the lock screen interface, etc.). As such, it should be broadly understood that, in some implementations, a suggested action element may not be indicative of a device action that is performable by the mobile computing system. Rather, a suggested action element may be or otherwise depict information for conveyance to the user.

In some implementations, to determine the one or more suggested action elements, the sensor data can be processed with a machine-learned action determination model (e.g., a neural network, a recurrent neural network, a convolutional neural network, one or more multi-layer perceptrons, etc.). The machine-learned action determination model can be configured to determine the one or more suggested action elements from the plurality of predefined action elements. In some implementations, the machine-learned action determination model can be a personalized model configured to determine the one or more suggested action elements most likely to be desired by the user by training the model based at least in part on data associated with the user (e.g., training the model in an unsupervised manner based at least in part on historical selections of suggested action elements by the user, etc.). As an example, one or more parameter(s) of the machine-learned action determination model can be adjusted based at least in part on the suggested action element.

In some implementations, the sensor data can include image data depicting one or more objects (e.g., from a front image sensor, rear image sensor, peripheral image sensor, etc.). The one or more suggested action elements can be based at least in part on the one or more objects, which can be determined by the mobile computing system (e.g., using one or more machine-learned object recognition model(s), etc.). As an example, the object depicted in the image data can be a sign for a fast food restaurant. Based at least in part on the object, the suggested action element can indicate a device action to execute a food delivery application to deliver food to the restaurant. Additionally, the sensor data (e.g., or an annotation of the sensor data, etc.), can be provided to the food delivery application such that the food delivery application is provided information regarding the recognized fast food restaurant sign. In such fashion, the image data and/or audio data can be analyzed by the mobile computing system (e.g., using one or more machine-learned models, etc.) to determine suggested action element(s).

In some implementations, determining the one or more suggested action elements can include displaying textual content descriptive of at least a portion of audio data within the lock screen interface. As a more particular example, the sensor data captured by the mobile computing system can include image data and audio data including speech from the user. The mobile computing system can determine the one or more suggested action elements, and can also display textual content descriptive of at least a portion of the audio data. For example, the mobile computing system can display a transcription of at least a portion of the audio data within the lock screen interface. In some implementations, the transcription can be displayed in real-time within the lock screen interface for as long as the input collection element is selected by the user.

Systems and methods of the present disclosure provide a number of technical effects and benefits. As one example technical effect and benefit, current user interface implementations for mobile devices generally require a series of onerous, time-consuming interactions from users. Further, the complexity and time required to navigate to certain applications can prohibit users from capturing real-time events. For example, a user wishing to quickly capture a real-time event (e.g., a moment in a sporting event, etc.) is generally required to navigate through a series of interfaces (e.g., a lock-screen interface, a home screen interface, etc.) before opening a camera application to initiate data recording, therefore making it prohibitively difficult to capture sensor data as the event occurs. For another example, the requirement to navigate multiple user interfaces before opening an application can generally lead users to forget the initial purpose for operating their mobile devices before they are able to access an initially desired application, therefore significantly decreasing the efficiency of the users when utilizing the device. In response, systems and methods of the present disclosure allow users to initiate capture of sensor data near-instantaneously, therefore significantly increasing the speed and efficiency in which users navigate the interfaces of their mobile devices. Additionally, by substantially reducing the time required to operate the device before capturing sensor data, systems and methods of the present disclosure can substantially reduce the utilization of power, computational resources (e.g., CPU cycles, memory, etc.), and battery life involved in the initiation of sensor data capture.

With reference now to the Figures, example embodiments of the present disclosure will be discussed in further detail.

Example Devices and Systems

FIG. 1A depicts a block diagram of an example computing system 100 that performs efficient input signal collection according to example embodiments of the present disclosure. The computing system 100 includes a mobile computing system 102 and a server computing system 130 that are communicatively coupled over a network 180.

The mobile computing system 102 can be any type of computing device, such as, for example, a personal computing device (e.g., laptop or desktop), a mobile computing system (e.g., smartphone or tablet), a gaming console or controller, a wearable computing device, an embedded computing device, or any other type of computing device.

The mobile computing system 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the mobile computing system 102 to perform operations.

In some implementations, the mobile computing system 102 can store or include one or more machine-learned action determination models 120. For example, the machine-learned action determination models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned action determination models 120 are discussed with reference to FIG. 2.

In some implementations, the one or more machine-learned action determination models 120 can be received from the server computing system 130 over network 180, stored in the mobile computing system memory 114, and then used or otherwise implemented by the one or more processors 112. In some implementations, the mobile computing system 102 can implement multiple parallel instances of a single machine-learned action determination model 120 (e.g., to perform parallel action determination across multiple instances of the machine-learned action determination model).

More particularly, in some implementations, to determine the one or more suggested action elements, sensor data can be processed by the mobile computing system 102 with the machine-learned action determination model 120 (e.g., a neural network, a recurrent neural network, a convolutional neural network, one or more multi-layer perceptrons, etc.). The machine-learned action determination model 120 can be configured to determine the one or more suggested action elements from the plurality of predefined action elements. In some implementations, the machine-learned action determination model 120 can be a personalized model configured to determine the one or more suggested action elements most likely to be desired by the user by training the model 120 based at least in part on data associated with the user (e.g., training the model in an unsupervised manner based at least in part on historical selections of suggested action elements by the user, etc.). As an example, one or more parameter(s) of the machine-learned action determination model 120 can be adjusted based at least in part on the suggested action element.

The mobile computing system 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The mobile computing system 102 can include a plurality of sensors 124. As an example, the sensors 124 can include a plurality of image sensors (e.g., front image sensor(s) 124A, rear image sensor(s) 124B, peripheral image sensor(s) 124C, etc.). For example, the mobile computing system 102 can be or otherwise include a smartphone device, and the peripheral image sensor(s) can be or otherwise include one or more camera(s) positioned about the periphery of the smartphone (e.g., positioned perpendicularly to the front image sensor(s) 124A about the edge(s) of the smartphone, etc.). As another example, the sensors 124 can include audio sensor(s) 124D (e.g., microphone(s), etc.). As yet another example, the sensors 124 can include one or more miscellaneous sensor(s) 124E (e.g., image sensor(s), audio sensor(s), accelerometer(s), GPS sensor(s), LIDAR sensor(s), infrared sensor(s), ambient light sensor(s), proximity sensor(s), biometric sensor(s), barometer(s), gyroscope(s), NFC sensor(s), ultrasound sensor(s), heartbeat sensor(s), etc.). It should be noted that the mobile computing system 102 can include any sensor(s) conventionally utilized in or by mobile computing device(s).

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The mobile computing system 102 and/or the server computing system 130 can train the model 120 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned model 120 stored at the mobile computing system 102 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the model 120 based on a set of training data 162. The training data 162 can include, for example, historical user data indicative of past suggested action elements that were selected by the user. Additionally, or alternatively, in some implementations, the training data 162 can include historical user data indicative of past suggested action elements that were selected by a plurality of users. In such fashion, the machine-learned action determination model 120 can be trained to generate suggested action elements that are most likely to be preferred by a specific user and/or all users of the service. In some implementations, the training data also includes a record of the sensor data that was captured prior to the user making a particular selection. For example, in addition to knowing that the user selected the microphone to record audio data in a particular instance, the training data can also indicate that this selection corresponded to there being sound in the environment when the selection was made.

In some implementations, if the user has provided consent, the training examples can be provided by the mobile computing system 102. Thus, in such implementations, the model 120 provided to the mobile computing system 102 can be trained by the training computing system 150 on user-specific data received from the mobile computing system 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the mobile computing system 102 can include the model trainer 160 and the training dataset 162. In such implementations, the models 120 can be both trained and used locally at the mobile computing system 102. In some of such implementations, the mobile computing system 102 can implement the model trainer 160 to personalize the models 120 based on user-specific data. Likewise, the proposed systems can be implemented even when the mobile or user device is not connected to the network. For example, the device can open all sensors and route the user to most useful options with on-device services.

Figure 1B:
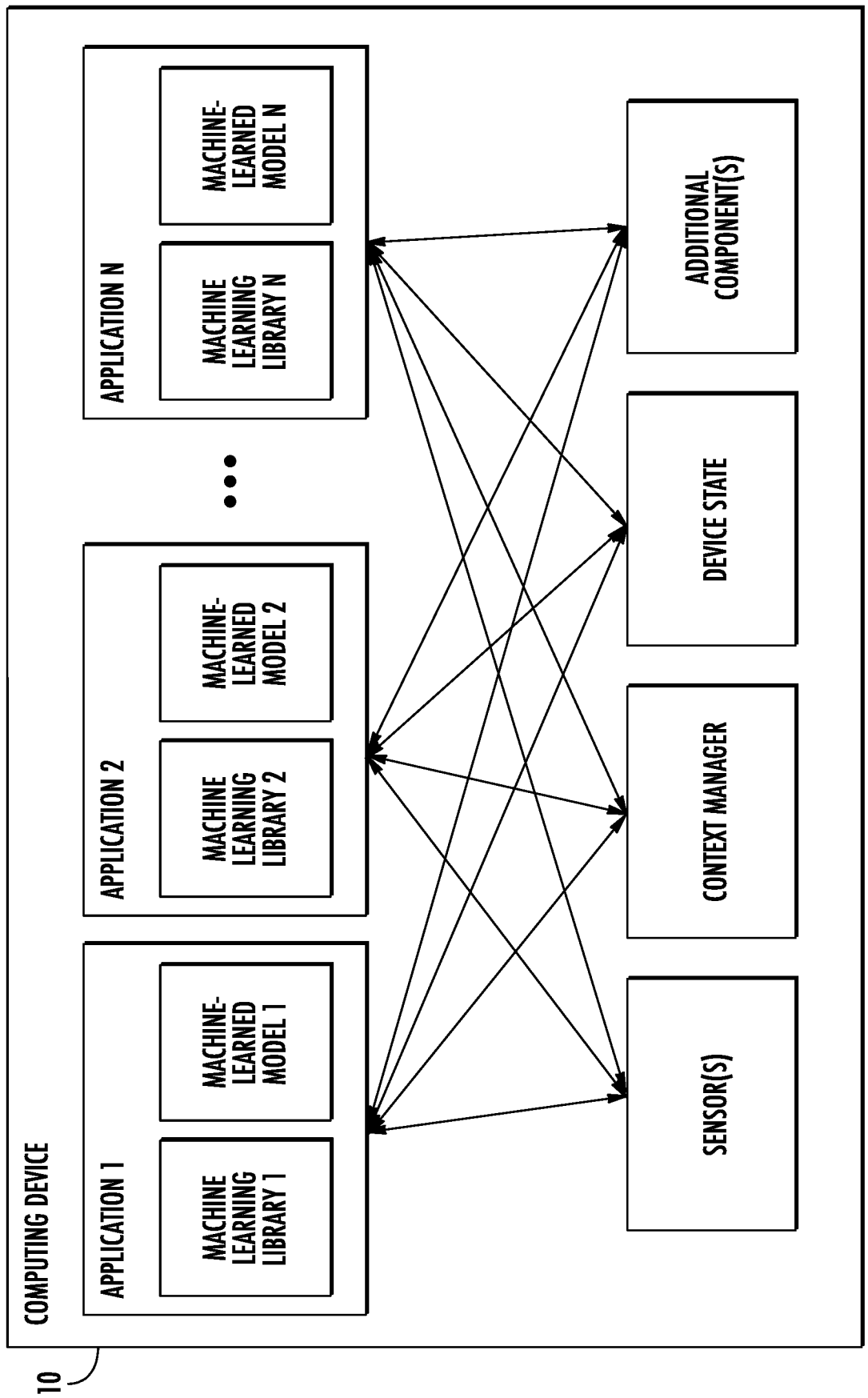
FIG. 1B depicts a block diagram of an example computing device that performs efficient input signal collection according to example embodiments of the present disclosure.

FIG. 1B depicts a block diagram of an example computing device 10 that performs efficient input signal collection according to example embodiments of the present disclosure. The computing device 10 can be a mobile computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
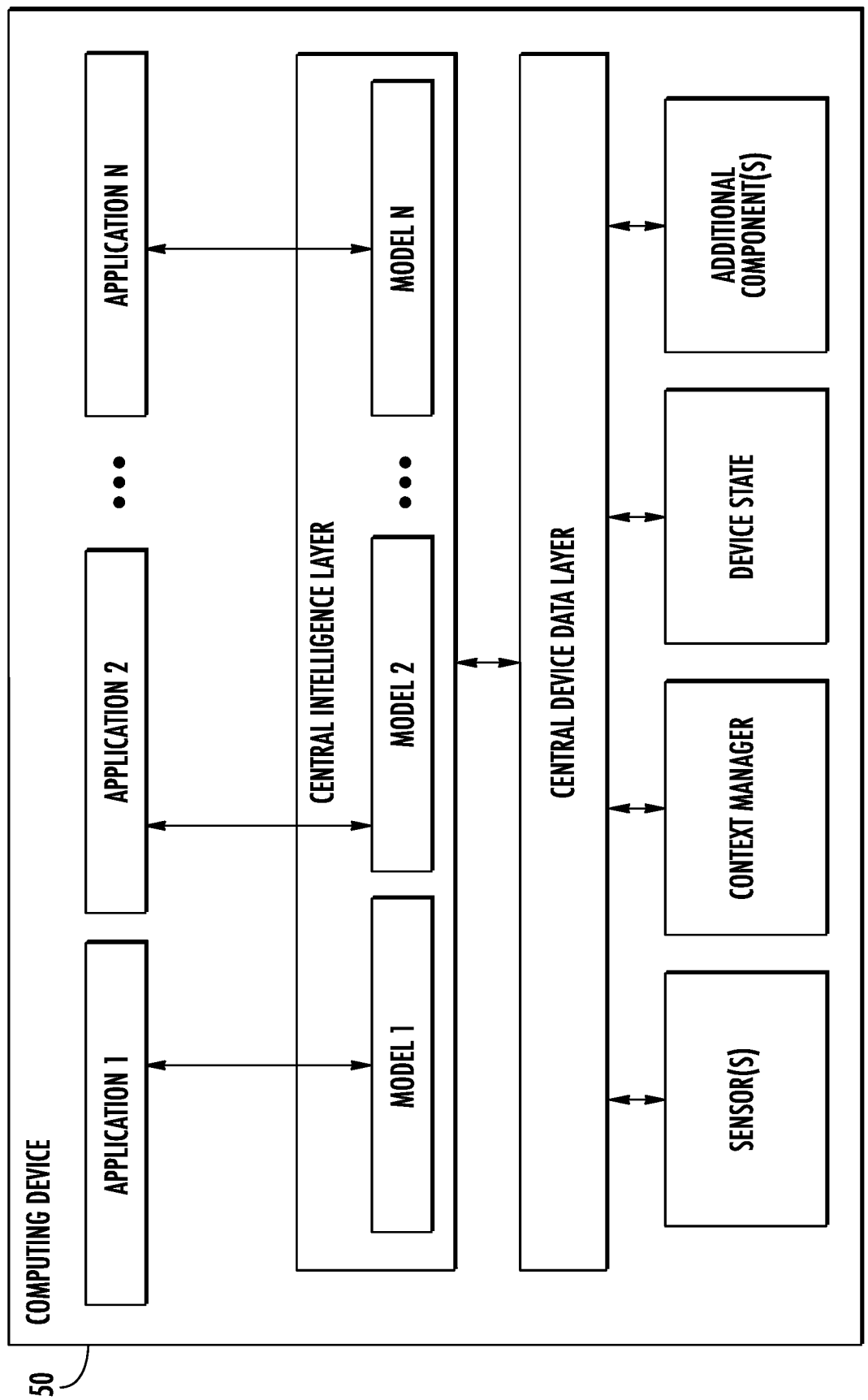
FIG. 1C depicts a block diagram of an example computing device that performs training and utilization of a machine-learned action determination model according to example embodiments of the present disclosure.

FIG. 1C depicts a block diagram of an example computing device 50 that performs training and utilization of a machine-learned action determination model according to example embodiments of the present disclosure. The computing device 50 can be a mobile computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
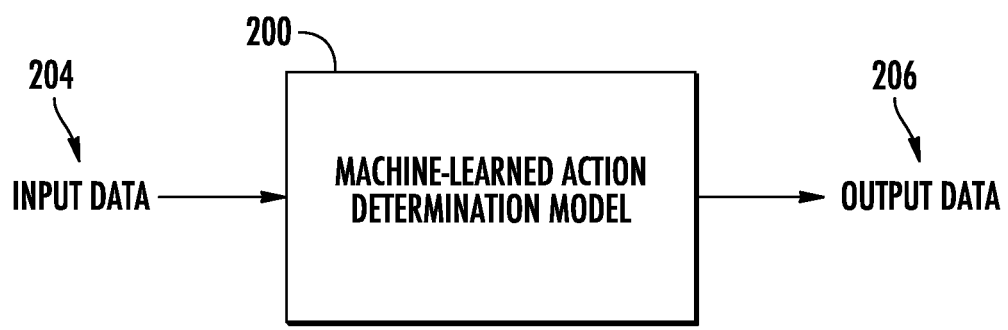
FIG. 2 depicts a block diagram of an example machine-learned action determination model according to example embodiments of the present disclosure.

FIG. 2 depicts a block diagram of an example machine-learned action determination model 200 according to example embodiments of the present disclosure. In some implementations, the machine-learned action determination model 200 is trained to receive a set of input data 204 descriptive of a plurality of input signals and, as a result of receipt of the input data 204, provide output data 206 that includes one or more suggested action elements. More particularly, the input data 204 can include or otherwise describe sensor data from a plurality of sensors of a mobile device (e.g., camera(s), microphone(s), accelerometer(s), etc.). The input data 204 can be processed with the machine-learned action determination model 200 (e.g., a neural network, a recurrent neural network, a convolutional neural network, one or more multi-layer perceptrons, etc.) to obtain the output data 206. The output data 206 can include one or more suggested action elements from a plurality of predefined action elements. In some implementations, the machine-learned action determination model 200 can be a personalized model configured to determine the one or more suggested action elements most likely to be desired by the user.

Figure 3:
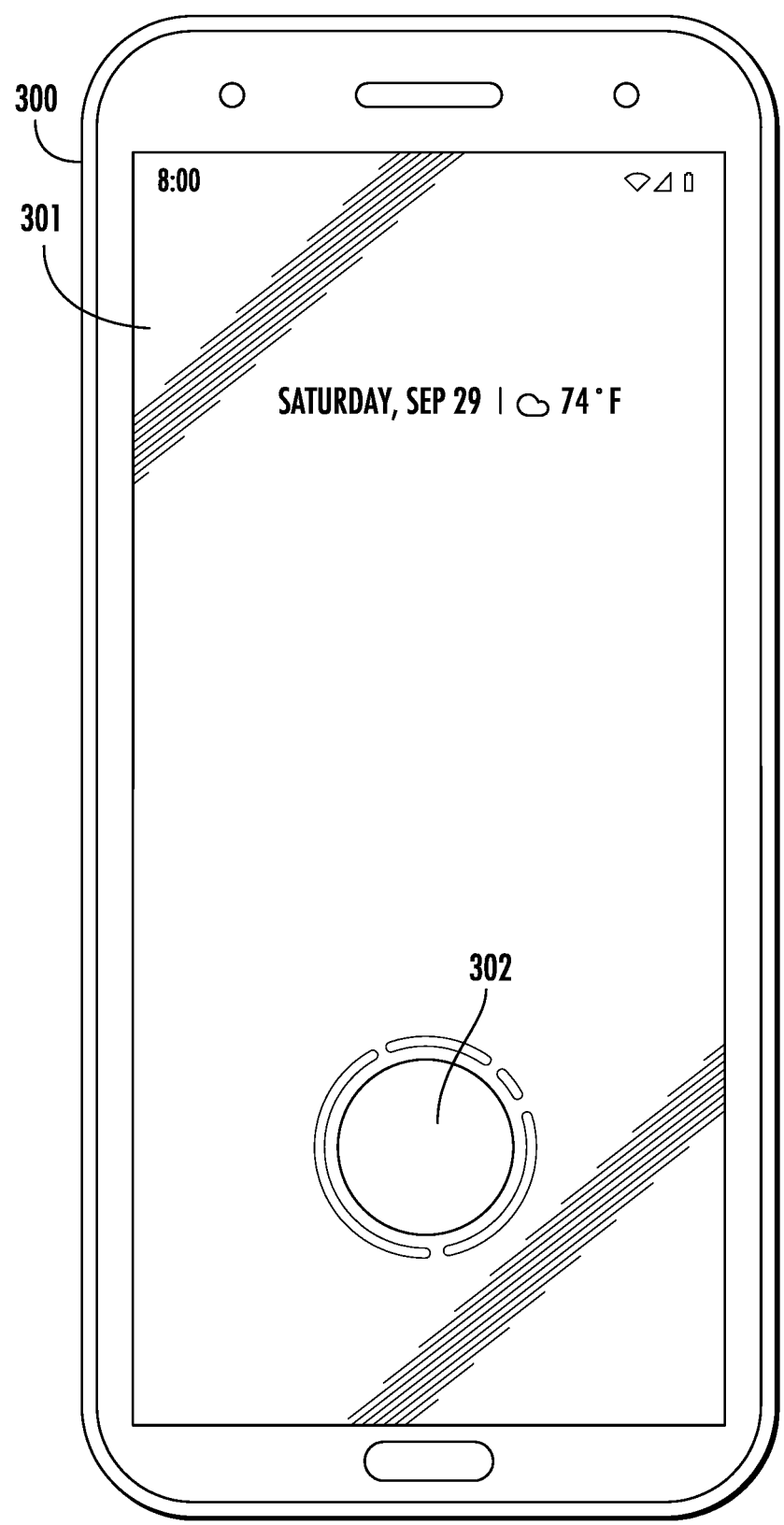
FIG. 3 depicts an example lock screen interface including an input collection element according to example embodiments of the present disclosure.

FIG. 3 depicts an example lock screen interface 301 including an input collection element 302 according to example embodiments of the present disclosure. More particularly, a lock screen interface 301 can be displayed at a display device associated with the mobile computing system 300 (e.g., a touch screen display device, etc.). The lock screen interface 301 can generally be understood to be an interface 301 first provided to the user after the mobile computing system 300 exits a rest state. As an example, the mobile computing system 300 can be in a "rest" state in which the display device associated with the mobile computing system 300 is not active (e.g., a "sleep" mode, etc.). The mobile computing system 300 can exit the rest state based on a certain stimulus (e.g., a certain movement of the mobile computing system 300, pressing a button on the mobile computing system 300, touching the display device of the mobile computing system 300, receiving notification data for an application executed at the mobile computing system 300, etc.) and can activate the display device associated with the mobile computing system 300. Once the display device has been activated, the lock screen interface 301 can be displayed at the display device. In one example, the device can shortcut from the rest state directly to capturing signals in some cases such as OLED screens that can display a low power affordance.

The lock screen interface 301 can include an input collection element 302. The input collection element 302 can be configured to capture multimodal sensor data while the input collection element 302 is selected. The input collection element 302 can be an icon or other representation that can be selected by the user. To follow the depicted example, the input collection element 302 can depict an icon indicative of the collection of input signals.

Figure 4:
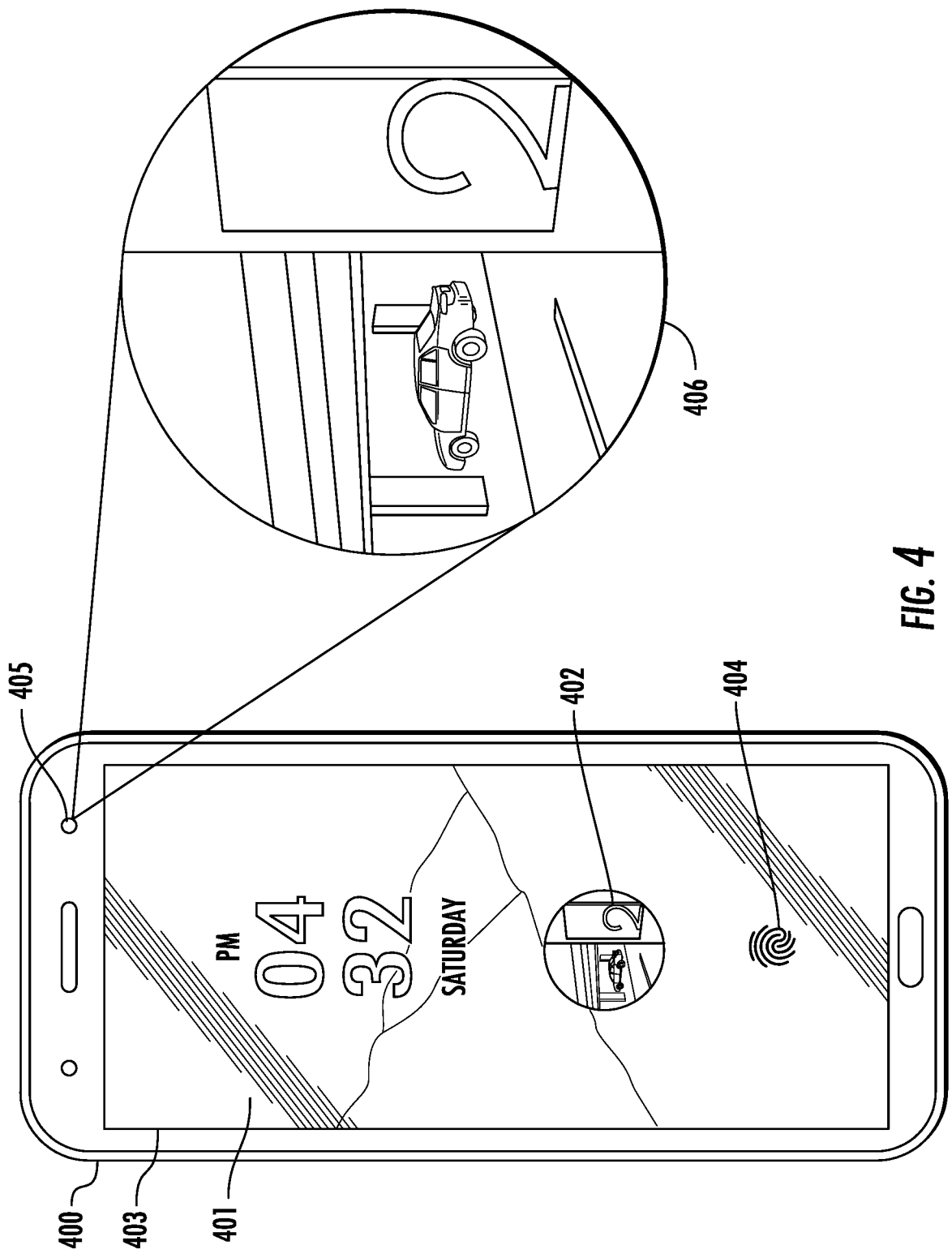
FIG. 4 depicts an example lock screen interface including a live-preview input collection element according to example embodiments of the present disclosure.

FIG. 4 depicts an example lock screen interface 401 including a live-preview input collection element 402 according to example embodiments of the present disclosure. More particularly, the lock screen 401 can be displayed on the display device of a mobile computing system 400. The lock screen 401 can include an input collection element 402. The input collection element 402 can be similar to the input collection element 302 of FIG. 3, except that the input collection element 402 can include or otherwise depict a preview of the sensor data 405 to be collected (e.g., image data, etc.). For example, a rear image sensor 405 of the mobile computing system 403 can periodically capture sensor data that includes image data 406 (e.g., every two seconds, periodically when the mobile computing system 403 is moved, etc.). The captured image data 406 can be included or otherwise depicted as a thumbnail within the input collection element 402. As another example, the input collection element 402 may include an audio waveform symbol indicative of audio data currently being captured by an audio sensor of the mobile computing system 403. In such fashion, the input collection element 402 can indicate to a user that interaction with the input collection element can initiate multimodal data collection, and can also indicate a preview of what data would be collected upon selection of the input collection element (e.g., a preview of what the image sensor(s) would currently capture, etc.).

Additionally, the lock screen interface 401 can include an authentication collection element 404. The authentication collection element 404 can indicate a certain type of authentication data to be collected, and can also indicate a status of the collection of the authentication data. To follow the depicted example, the authentication collection element 404 can be an icon representative of a fingerprint. In some implementations, the authentication collection element 404 can be overlaid on the location of a biometric sensor of the mobile computing system 403 (e.g., a thumbprint sensor positioned under the display device of the mobile computing system 403, etc.). Alternatively, in some implementations, the authentication collection element 404 can indicate that authentication data is required from the user. For example, the authentication collection element 404 can be depicted in a first color while the user has not provided authentication data (e.g., facial recognition data, biometric data, etc.). The authentication collection element 404 can be modified once the user has provided authentication data. For example, the authentication collection element 404 can change to a second color if the authentication data supplied by the user is accepted, and can change to a third color if the authentication data supplied by the user is rejected.

Figure 5:
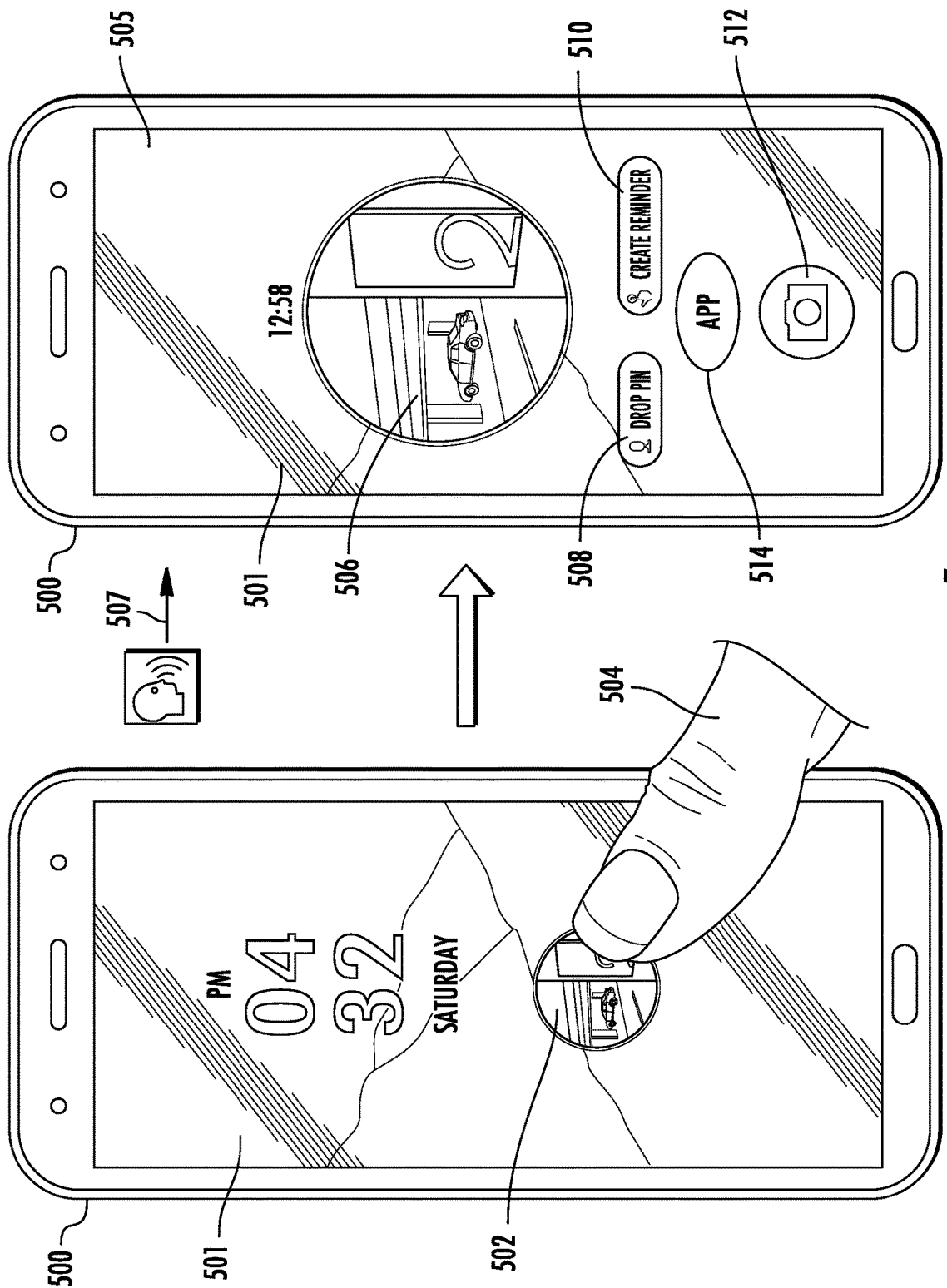
FIG. 5 depicts a graphical diagram for displaying one or more suggested action elements within a lock screen interface according to example embodiments of the present disclosure.

FIG. 5 depicts a graphical diagram for displaying one or more suggested action elements within a lock screen interface 501 according to example embodiments of the present disclosure. More particularly, a mobile computing system 500 can include a lock screen interface 501 that includes an input collection element 502. The mobile computing system 500 can obtain an input signal 504 that selects the input collection element 502 from a user of the mobile computing system 500. To follow the depicted example, the user can provide a touch gesture input signal 504 by touching the display device (e.g., a touchscreen) of the mobile computing system 500 where the input collection element 502 is located.

When the mobile computing system 500 obtains the input signal 504, sensor data can be collected from a plurality of sensors. To follow the depicted example, image data 506 can be captured from a rear image sensor of the mobile computing system 500, and audio data 507 can be captured by an audio sensor of the mobile computing system 500 (e.g., speech from the user, etc.). After capturing the sensor data 506/507, suggested action elements can be determined from a plurality of predefined action elements, and can be displayed within the lock screen interface 501. Additionally, the input collection element 502 can be modified to display at least a portion of the captured sensor data. For example, the input collection element can expand and can depict a portion of the captured image data 506.

One or more of the suggested action elements (e.g., 508, 510, 512, etc.) can be displayed within the lock screen interface. These suggested action elements can be determined based at least in part on the captured sensor data 506/507. As an example, the image data 506 can depict a parking garage. The image data 506 can be processed (e.g., processed using the machine-learned action determination model of FIG. 2, etc.), and based on what is depicted in the image data 506, the "drop pin" suggested action element 508 can be determined and displayed within the lock screen interface 501. As another example, the audio data 507 can include a speech command from the user that instructs the mobile computing system 500 (e.g., a virtual assistant application of the mobile computing system, etc.) to save a reminder. Based on the audio data 507, a "create reminder" suggested action element 510 can be determined and displayed within the lock screen interface 501. As yet another example, the image data 506 can be determined (e.g., using the machine-learned action determination model of FIG. 2, etc.) to be insufficient to determine suggested action element(s) (e.g., based on the image data being blurred, cropped, distorted, etc.). Based on the insufficiency of the captured image data 506, a suggested action element 512 can be displayed that is configured to capture additional sensor data when selected by the user. In such fashion, suggested device action indicators can be determined and displayed contextually based on the content of the captured sensor data 506/507.

Additionally, a suggested action element 514 can be determined based on the captured sensor data 506/507 and displayed within the lock screen interface 501. The suggested action element 514 can open an application based at least in part on the sensor data 506/507. As an example, the captured sensor data can be or otherwise include image data 506. Based on the capture of image data 506, a suggested action element 514 can be determined that opens an application that can utilize image data (e.g., a social networking application, a photo sharing application, a video editing application, a cloud storage application, etc.). As another example, the captured image data 506 can depict a certain storefront. The image data 506 can be processed (e.g., processed using the machine-learned action determination model of FIG. 2, etc.), and based on the image data 506, a suggested action element 514 can be determined that opens an application associated with the storefront (e.g., an online shopping application corresponding to the storefront, etc.). As yet another example, the captured audio data 507 can include speech from the user that instructs the mobile computing system 500 (e.g., a virtual assistant application of the mobile computing system 500, etc.) to open a virtual assistant application. Based on the audio data 507, a suggested action element 514 can be determined that opens the virtual assistant application.

It should be noted that in addition to opening an application when selected, the suggested action element 514 can additionally, or alternatively, provide the captured sensor data 506/507 to an application, and/or can generate instructions for the application. As an example, when selected, the suggested action element 514 may generate instructions for an application to share the image data 506 (e.g., as specified by speech from the user that is captured in the audio data 507, etc.). As such, it should be understood that selection of the suggested action element 514 can facilitate functionality of an application (e.g., through generation of instructions, etc.) without navigating away from the lock screen interface 501 or otherwise opening the application.

In some implementations, the user interface can include a "save-all" that enables the user to defer decisions till later. For example, the user can defer multiple options which enable the user to save as a reminder, a video, a still image, and/or other options. This can be referred to as a global save deferment.

Figure 6:
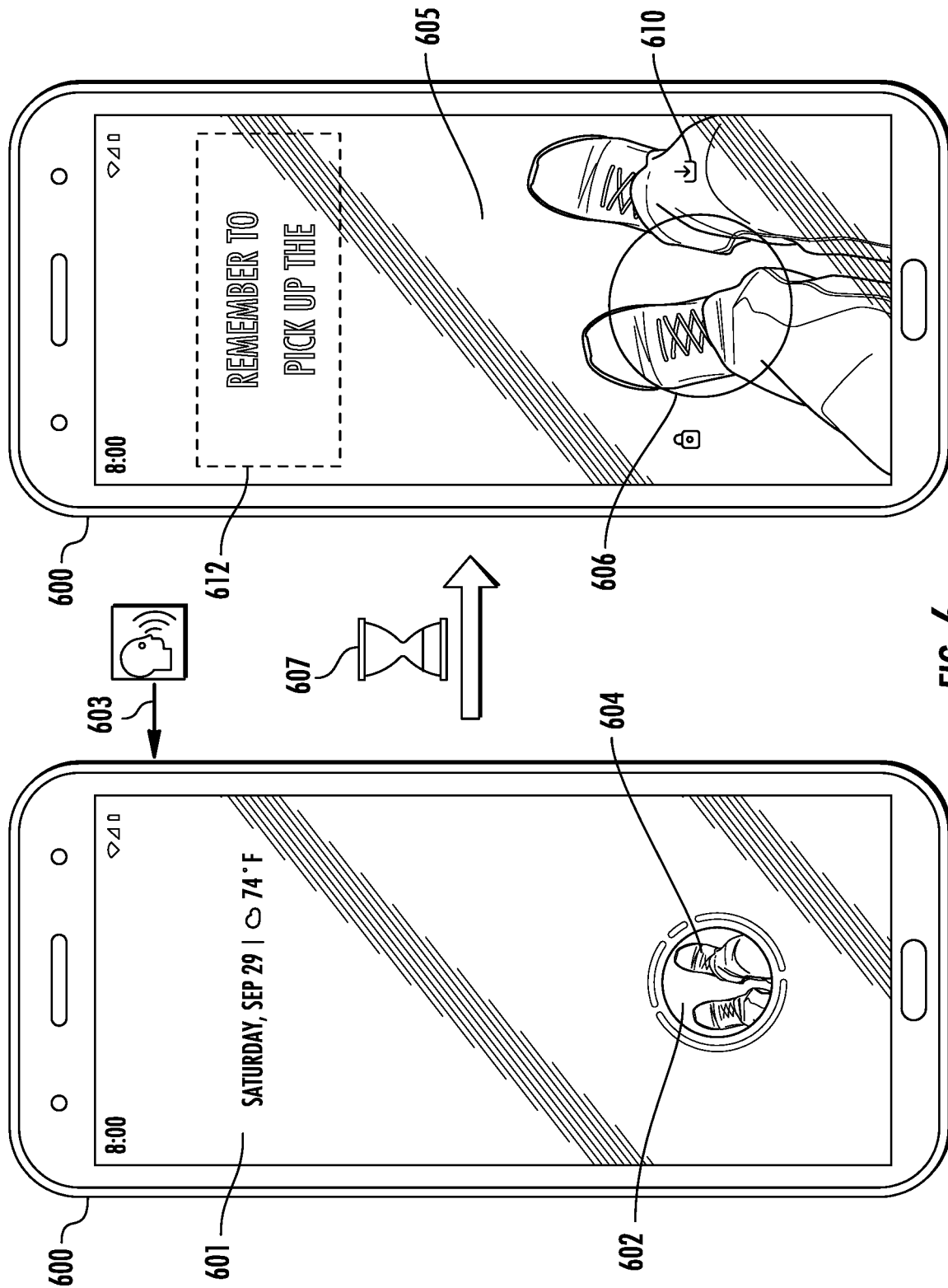
FIG. 6 depicts a graphical diagram for capturing sensor data over a period of time within a lock screen interface according to example embodiments of the present disclosure.

FIG. 6 depicts a graphical diagram for capturing sensor data over a period of time within a lock screen interface 601 according to example embodiments of the present disclosure. More particularly, a mobile computing system 600 can display a lock screen interface 601, which can include an input collection element 602. The mobile computing system 600 can receive an input signal 604 from a user that selects the input collection element 602.

In response, the mobile computing system 600 can obtain sensor data that includes audio data 603 and image data 605. The sensor data can be collected similarly to the sensor data 506/507 of FIG. 5, except that the input signal 604 can be a touch gesture that is performed at the display device (e.g., touchscreen, etc.) of the mobile computing system 600 for a period of time 607. For example, the input signal 604 can be a user touching the location of the input collection element 602 for a period of time 607. For the duration of the period of time, the audio data 603 and the image data 605 can be collected.

Concurrently with the capture of the audio data 603 and the image data 605 over the period of time 607, suggested action elements and displayed within the lock screen interface 601. As an example, while the user provides the input signal 604 over the period of time, a "transcription" suggested action element 612 can be determined and displayed within the lock screen interface 601. The suggested action element 612 can be or otherwise include a real-time textual transcription of speech as the speech is captured within the audio data 603 (e.g., using machine-learned speech recognition model(s), etc.).

As another example, while the user provides the input signal 604 over the period of time, a "recording capacity" suggested action element 606 can be determined and displayed within the lock screen interface 601. The suggested action element 606 can depict or otherwise indicate a maximum amount of time that the mobile computing system 600 can capture the image data 605. Concurrently, the image data 605 can be displayed within the lock screen interface 601. In such fashion, the mobile computing system 600 can indicate to the user a maximum to the period of time 607 in which the input signal 604 is provided by the user. After the period of time 607 in which the user provides the input signal 604 to the mobile computing system 600, a suggested action element 610 can be displayed that allows the user to manipulate the captured sensor data 603/605 (e.g., store at least a portion of the sensor data 603/605, delete at least a portion of the sensor data 603/605, display at least a portion of the sensor data 603/605, provide the sensor data 603/605 to an application, etc.).

Figure 7:
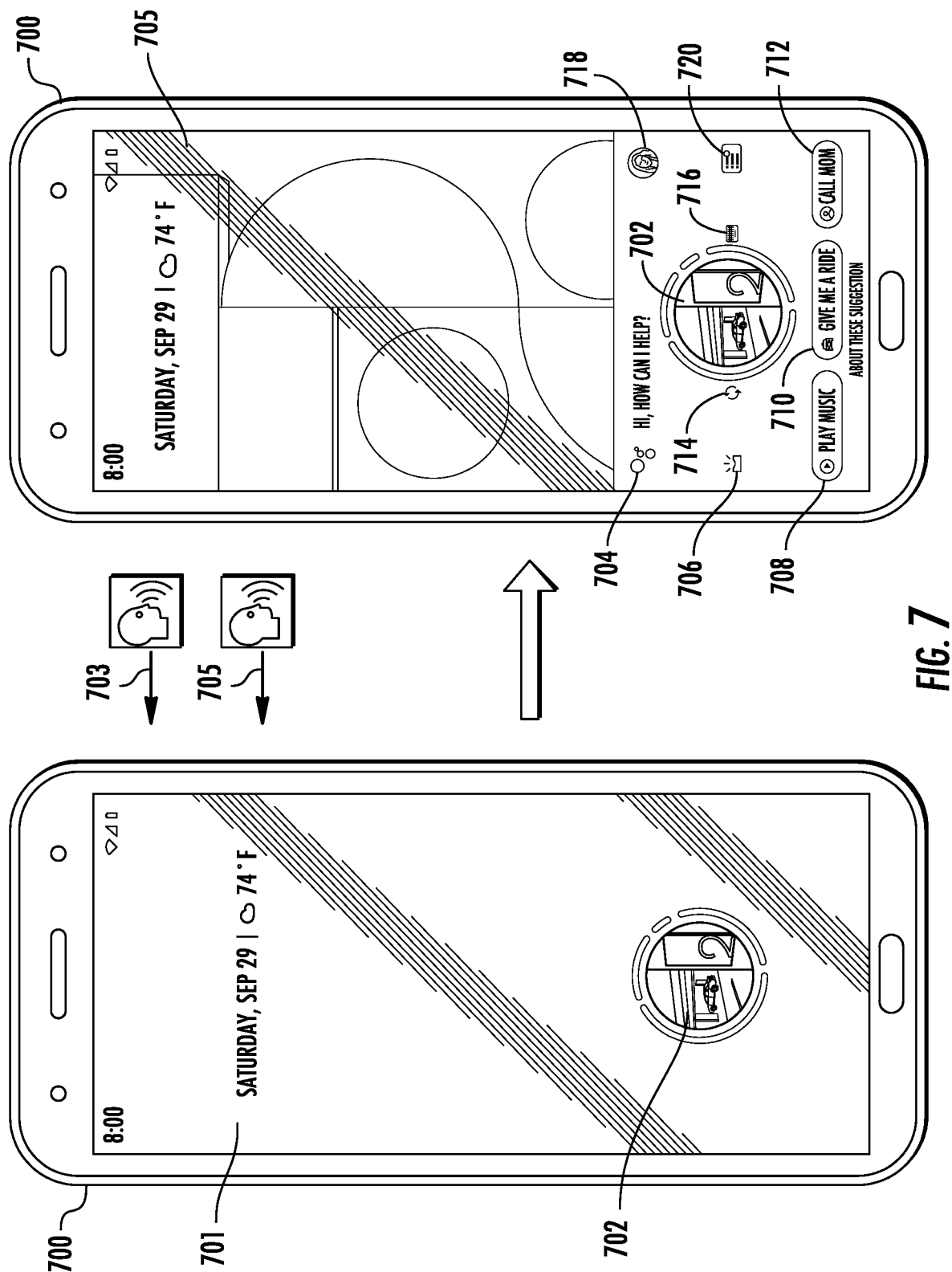
FIG. 7 depicts a graphical diagram for displaying one or more suggested action elements in response to obtaining an input signal from a user according to example embodiments of the present disclosure.

FIG. 7 depicts a flow chart diagram for displaying one or more suggested action elements in response to obtaining an input signal 703 from a user according to example embodiments of the present disclosure. More particularly, a mobile computing system 700 can display a lock screen interface 701 within a display device of the mobile computing system (e.g., a touchscreen device, etc.). The lock screen interface 701 can include an input collection element 702 as previously described with regards to FIG. 5. The mobile computing system 700 can obtain an input signal 703. To follow the depicted example, the input signal 703 can be or otherwise include audio data that selects the input collection element 702. For example, the input signal 703 may be audio data that includes speech descriptive of a command from the user that is programmed to activate the input collection element 702 (e.g., a user saying "start recording", etc.). In some implementations, the input signal 703 may be audio data that includes speech descriptive of a command from the user that is programmed to activate the input collection element 702 for a period of time (e.g., a user saying "record for 15 seconds", etc.). It should be noted that the input signal 703 is depicted as audio data merely to illustrate the example embodiment of the present disclosure. Rather, the input signal 703 can be any sort of signal or collection of signals. As an example, the input signal 703 can be accelerometer data that indicates a movement pattern of the mobile computing system 700 by the user that is pre-programmed to select the input collection element 702. As such, it should be broadly understood that the input signal 703 can be or otherwise include any type of signal data from any sensor and/or collection of sensors of the mobile computing system 700.

In response to obtaining the input signal 703, the mobile computing system 700 can capture sensor data 705. To follow the depicted example, the sensor data 705 can be audio data that includes speech from the user descriptive of a command to open a virtual assistant application 704. Based on the sensor data 705, the mobile computing system 700 can determine one or more suggested action elements and display them within the lock screen interface 701. As an example, the mobile computing system 700 can determine an "application window" suggested action element 718 that corresponds to the virtual assistant application 704, and can display the suggested action element 718 within the lock screen interface. It should be noted that in some implementations, a suggested action element can be or otherwise include a window in which an application is executed that is displayed within the lock screen. To follow the depicted example, the virtual assistant application 704 can be executed within the suggested action element 718 (e.g., as a window of the application, etc.). In such fashion, the user can interact directly with an application from the lock screen, therefore obviating the need to navigate a series of user interfaces to open the application directly. Additionally, the "application window" suggested action element 718 can include additional suggested action elements, which can be selected by the user to interact with the application 704 (e.g., 708, 710, 712, etc.).

The suggested action element 718 can include a plurality of additional suggested action elements, which can be determined based at least in part on the sensor data 705. As an example, the sensor data 705 can correspond to a certain music artist (e.g., image data depicting an album cover, audio data including a portion of music from the music artist, etc.). In response, a suggested action element 708 can indicate a device action that executes a music application separate from the virtual assistant application 704. As another example, the sensor data 705 can include geolocation data that indicates the user is located at an airport. In response, a suggested action element 710 can indicate a device action that prompts the virtual assistant application to interface with a rideshare application. As yet another example, the sensor data 750 can include user historical data that indicates the user prefers to call a family member at the current time. In response, a suggested action element 712 can correspond to an action that, when selected, initiates a call to the user's family member.

The suggested action element 718 can include the input collection element 702. As described previously with regards to FIG. 4, the input collection element 702 can include or otherwise depict a preview of the sensor data to be collected. Additionally, the suggested action element 718 can include suggested action elements that correspond to input control device actions. As an example, the suggested action element 718 can include a suggested action element 714 that instructs the mobile computing system 700 to collect sensor data from the front image sensor rather than the rear image sensor, or vice-versa. As another example, the suggested action element 718 can include a suggested action element 716 that instructs the mobile computing system 700 to collect additional user input from a virtual keyboard application. In such fashion, the suggested action element 718 can include additional suggested action element(s) that allow the user to control various setting(s) or function(s) of the mobile computing system 700 (e.g., various power operating modes of the mobile computing system 700 (e.g., a WIFI switch, an airplane mode switch, etc.), input mode(s), sensor mode(s), etc.).

Example Methods

Figure 8:
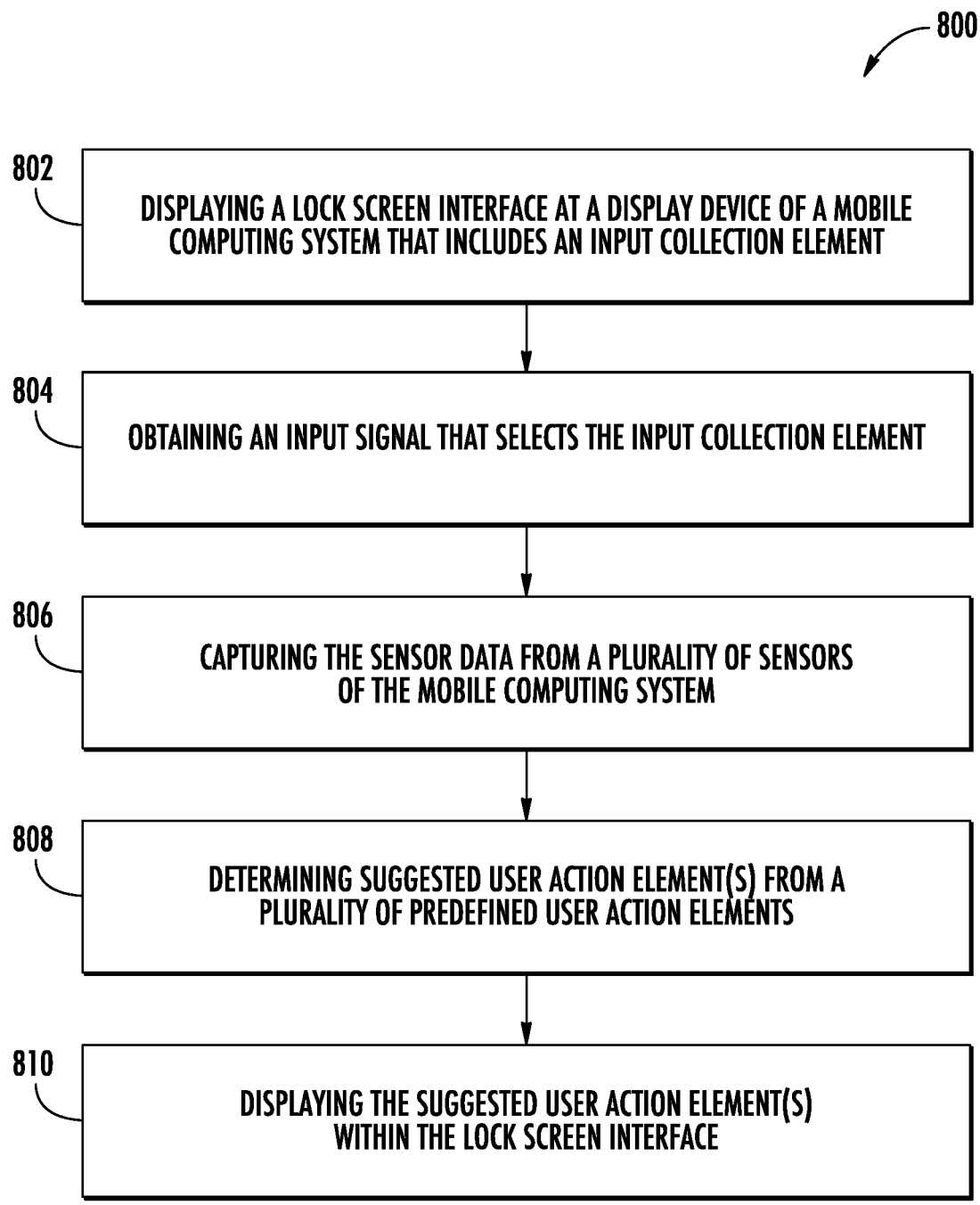
FIG. 8 depicts a flow chart diagram of an example method to perform efficient multimodal input collection according to example embodiments of the present disclosure.

FIG. 8 depicts a flow chart diagram of an example method 800 to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system (e.g., a mobile computing system, a smartphone device, etc.) can display a lock screen interface at a display device of a mobile computing system that includes an input collection element. More particularly, the mobile computing system can display a lock screen interface at the display device associated with the mobile computing system (e.g., a touch screen display device, etc.). The lock screen interface can be or otherwise include an interface that requests interaction and/or authentication from a user before granting access to a separate interface of the mobile computing system. More particularly, the lock screen interface can generally be understood to be an interface first provided to the user after the mobile computing system exits a rest state. As an example, the mobile computing system can be in a "rest" state in which the display device associated with the mobile computing system is not active (e.g., a "sleep" mode, etc.). The mobile computing system can exit the rest state based on a certain stimulus (e.g., a certain movement of the mobile computing system, pressing a button on the mobile computing system, touching the display device of the mobile computing system, receiving notification data for an application executed at the mobile computing system, etc.) and can activate the display device associated with the mobile computing system. Once the display device has been activated, the lock screen interface can be displayed at the display device.

In some implementations, the lock screen interface may request authentication data from a user (e.g., fingerprint data, facial recognition data, password data, etc.). Additionally, or alternatively, in some implementations, the lock screen interface may request an input signal from a user (e.g., a slide gesture on an "open screen" action element, a movement of the mobile computing system, pressing a physical button of the mobile computing system, a voice command, etc.). As an example, the lock screen interface can include an authentication collection element. The authentication collection element can indicate a certain type of authentication data to be collected, and can also indicate a status of the collection of the authentication data. For example, the authentication collection element can be an icon representative of a fingerprint (e.g., overlaid on a location of a segment of the display device configured to collect fingerprint data, etc.), and the authentication collection element can be modified to indicate whether the authentication data has been collected and/or accepted (e.g., changing the icon from a red color to a green color upon successful authentication of biometric data, etc.).

The lock screen interface can include an input collection element. The input collection element can be configured to capture multimodal sensor data while the input collection element is selected. The input collection element can be an icon or other representation that can be selected by the user. As an example, the input collection element can be an icon that indicates the initiation of multimodal input collection when selected. In some implementations, the input collection element can include or otherwise represent a preview of the multimodal sensor data to be collected. As an example, the input collection element can include or otherwise represent a preview of what an image sensor of the camera is currently capturing. For example, a rear image sensor of the mobile computing system can periodically capture image data (e.g., every two seconds, periodically when the mobile computing system is moved, etc.). The captured image data can be included as a thumbnail within the input collection element. As another example, the input collection element may include an audio waveform symbol indicative of audio data currently being captured by an audio sensor of the mobile computing system. In such fashion, the input collection element can indicate to a user that interaction with the input collection element can initiate multimodal data collection, and can also indicate a preview of what data would be collected upon selection of the input collection element (e.g., a preview of what the image sensor(s) would currently capture, etc.).

In some implementations, the input collection element can be selected for a period of time, and can be configured to capture sensor data for that period of time. As an example, the input collection element can be configured to be selected via a touch gesture or a touch-and-hold gesture (e.g., placing a finger at the location of the input collection element and holding the finger at that location for a period of time, etc.). If selected via the touch gesture, the input collection element can capture sensor data for that instant of time corresponding to the touch gesture or can capture sensor data for a predetermined amount of time (e.g., two seconds, three seconds, etc.). If selected via the touch-and-hold gesture, the input collection element can capture sensor data for the amount of time that the touch-and-hold gesture is provided (e.g., recording video and audio data for as long as a user touches the input collection element, etc.).

At 804, the computing system can obtain an input signal that selects the input collection element. More particularly, the computing system can obtain an input signal from a user of the mobile computing system that selects the input collection element. As an example, the input signal can be a touch gesture or a touch-and-hold gesture at the location of the input collection element as displayed on the display device. It should be noted that the input signal is not necessarily required to be a touch gesture. Rather, the input signal can be any type or manner of input signal from the user that selects the input collection element. As an example, the input signal can be a voice command from the user. As another example, the input signal can be a movement of the mobile computing system by the user. As another example, the input signal can be a gesture performed by the user and captured by an image sensor of the mobile computing system (e.g., a hand gesture performed in front of the front image sensor of the mobile computing system, etc.). As another example, the input signal can be or otherwise include a plurality of input signals from the user. For example, the input signal may include a movement of the mobile computing system and a voice command from the user.

In some implementations, the type of sensor data collected can be based at least in part on the type of input signal obtained from the user. As an example, if the input signal is or otherwise includes a touch gesture (e.g., briefly touching the location of the input collection element on the display device, etc.), the input collection element can collect a single image using image sensor(s) (e.g., a front image sensor, a rear image sensor, a peripheral image sensor, etc.). If the input signal is or otherwise includes a touch-and-hold gesture (e.g., placing a finger at the location of the input collection element and holding the finger at that location for a period of time, etc.), the input collection element can collect video data (e.g., a plurality of image frames) for as long as the touch-and-hold input signal is maintained. In such fashion, the input collection element can provide the user precise control over the type and/or duration of the input signal that is collected from the sensors of the mobile computing system.

In some implementations, preliminary sensor data can be collected for a period of time before obtaining the input signal that selects the input collection element. More particularly, preliminary sensor data (e.g., image data, etc.) can be continuously collected and updated so that the preliminary sensor data collected over a period of time can be appended to the sensor data collected after the input collection element is selected. As an example, the mobile computing system can continuously capture the last five seconds of preliminary image data before the input collection element is selected. The five seconds of preliminary image data can be appended to the sensor data collected after the input collection element was selected. In such fashion, in the case of a real-time, quickly-occurring event, the user can access sensor data even if the user was not fast enough to select the input collection element in time to capture the real-time event. Additionally, in some implementations, the input collection element can include at least a portion of the preliminary sensor data (e.g., image data, etc.). As an example, the preliminary sensor data can include image data. The image data can be presented within the input collection element (e.g., depicted within the center of the input collection element, etc.). In such fashion, the input collection element can act as a preview to the user of what image data would be collected if the user were to select the input collection element.

At 806, the computing system can capture the sensor data from a plurality of sensors of the mobile computing system. More particularly, the computing system can, in response to obtaining the input signal, capture the sensor data from a plurality of sensors of the mobile computing system. The plurality of sensors can include any conventional or future sensor devices included within mobile computing system(s) (e.g., image sensor(s), audio sensor(s), accelerometer(s), GPS sensor(s), LIDAR sensor(s), infrared sensor(s), ambient light sensor(s), proximity sensor(s), biometric sensor(s), barometer(s), gyroscope(s), NFC sensor(s), ultrasound sensor(s), etc.). As an example, the mobile computing system can include a front image sensor, a rear image sensor, a peripheral image sensor (e.g., an image sensor positioned about the edge of the mobile computing system and perpendicular to the front and rear image sensor(s), etc.), and an audio sensor. In response to obtaining the input signal the mobile computing system can capture the sensor data from the front image sensor and the audio sensor. As another example, the mobile computing system can include an audio sensor, a rear image sensor, and a LIDAR sensor. In response to obtaining the input signal, the mobile computing system can capture sensor data from the rear image sensor, the audio sensor, and the LIDAR sensor.

At 808, the computing system can determine suggested action element(s) from a plurality of predefined action elements. More particularly, the computing system can, based at least in part on the sensor data from the plurality of sensors, determine one or more suggested action elements from a plurality of predefined action elements. The one or more action elements can be or otherwise include elements that can be selected by the user of the mobile computing system. More particularly, each of the one or more suggested action elements can be indicative of a respective device action, and can be configured to execute the respective device action when selected.

The suggested action element(s) can be elements that can be selected by the user of the mobile computing system. As an example, the suggested action element(s) can be interface elements displayed on the display device (e.g., touch icon(s), etc.), and can be selected by the user with a touch gesture. As another example, the suggested action element(s) can be or otherwise include descriptive text, and can be selected by the user with a voice command. As yet another example, the suggested action element(s) can be icons indicative of a pattern of movement, and can be selected by the user by replicating the pattern of movement with the mobile computing system. For example, a suggested action element may be configured to share data with a separate user in proximity to the user, and the suggested action element may be indicative of a "shaking" motion (e.g., a hand grasping a mobile computing system that indicates the mobile computing system is being shaken, etc.). If the user replicates the pattern of movement (e.g., shakes the mobile computing system, etc.), the data can be shared to the separate user.

The one or more suggested action elements can be indicative of one or more respective device actions. The device actions(s) can include actions that can be performed by the mobile computing system using the captured sensor data (e.g., storing the data, displaying the data, editing the data, sharing the data, deleting the data, transcribing the data, providing the sensor data to an application, opening an application associated with the data, generating instructions for an application based on the data, etc.). As an example, the captured data can include image data. Based on the image data, a suggested action element can be determined that is indicative of a device action to share the image data with a second user. To follow the previous example, a second suggested action element can be determined that is indicative of a device action to open an application that can utilize the image data (e.g., a social networking application, a photo editing application, a messaging application, a cloud storage application, etc.). As another example, the captured data can include image data depicting a scene and audio data. The audio data can include a vocalization of an application name by the user. A suggested action element can be determined that is indicative of a device action to execute the application of the vocalized application name. As another example, the captured data can include image data depicting a scene and audio data. The audio data can include a vocalization of virtual assistant command by the user. A suggested action element can be determined that is indicative of a device action to provide the sensor data to the virtual assistant. In response, the visual assistant application can provide additional suggested action element(s) to the user based on the sensor data (e.g., search results for captured image data, search results for a query included in captured audio data, etc.).

Each of the one or more suggested action elements can be selected from a plurality of predefined action elements. To follow the previous example, each of the previously described action elements can be included in the plurality of predefined action elements (e.g., copying data, sharing data, opening a virtual assistant application, etc.). Based on the sensor data, the one or more suggested action elements can be selected from the plurality of predefined action elements.

At 810, the computing system can display the suggested action element(s) within the lock screen interface. More particularly, the computing system can display the suggested action element(s) within the lock screen interface at the display device of the computing system. As an example, the suggested action elements can be or otherwise include icon(s) that are selectable by the user (e.g., via a touch gesture at the display device, etc.). The icon(s) can be displayed in the lock screen interface of the display device (e.g., above the input collection element, below the input collection element, about the input collection element, etc.).

In some implementations, an input signal can be obtained from the user that selects a suggested action element of the one or more suggested action elements. In response, the mobile computing system can perform the device action indicated by the suggested action element. As an example, a suggested action element indicative of a virtual assistant application can be displayed within the lock screen interface at the display device. The input signal from the user can select the suggested action element (e.g., via a touch gesture, voice command, movement input, etc.). The mobile computing system can execute the virtual assistant application and provide the sensor data to the virtual assistant application. It should be noted that the suggested action element can be selected in an identical or substantially similar manner as previously described with regards to the input collection element.

In some implementations, the mobile computing system may cease displaying the lock screen interface, and instead display an interface corresponding to the virtual assistant application at the display device. Alternatively, in some implementations, the mobile computing system may determine and display additional suggested action element(s) in response to providing the sensor data to the virtual assistant application. As an example, the sensor data can be provided to the virtual assistant application in response to the user selecting a suggested action element indicative of the virtual assistant application. The virtual assistant application can process the sensor data and generate an output (e.g., processing image data depicting textual content and generating search results based on the textual content. One or more additional suggested action elements can be displayed within the lock screen interface based on the output of the virtual assistant application (e.g., providing a suggested action element indicative of mapping data associated with the sensor data, etc.). For example, if the sensor data includes a query, the suggested action elements based on the output data may be or otherwise include results responsive to the query. For another example, if the sensor data includes audio data, the suggested action element(s) based on the output data may be or otherwise depict a transcription of the audio data (e.g., a textual transcription displayed over the lock screen interface, etc.). As such, it should be broadly understood that, in some implementations, a suggested action element may not be indicative of a device action that is performable by the mobile computing system. Rather, a suggested action element may be or otherwise depict information for conveyance to the user.

In some implementations, to determine the one or more suggested action elements, the sensor data can be processed with a machine-learned action determination model (e.g., a neural network, a recurrent neural network, a convolutional neural network, one or more multi-layer perceptrons, etc.). The machine-learned action determination model can be configured to determine the one or more suggested action elements from the plurality of predefined action elements. In some implementations, the machine-learned action determination model can be a personalized model configured to determine the one or more suggested action elements most likely to be desired by the user by training the model based at least in part on data associated with the user (e.g., training the model in an unsupervised manner based at least in part on historical selections of suggested action elements by the user, etc.). As an example, one or more parameter(s) of the machine-learned action determination model can be adjusted based at least in part on the suggested action element.

In some implementations, the sensor data can include image data depicting one or more objects (e.g., from a front image sensor, rear image sensor, peripheral image sensor, etc.). The one or more suggested action elements can be based at least in part on the one or more objects, which can be determined by the mobile computing system (e.g., using one or more machine-learned object recognition model(s), etc.). As an example, the object depicted in the image data can be a sign for a fast food restaurant. Based at least in part on the object, the suggested action element can indicate a device action to execute a food delivery application to deliver food to the restaurant. Additionally, the sensor data (e.g., or an annotation of the sensor data, etc.), can be provided to the food delivery application such that the food delivery application is provided information regarding the recognized fast food restaurant sign. In such fashion, the image data and/or audio data can be analyzed by the mobile computing system (e.g., using one or more machine-learned models, etc.) to determine suggested action element(s).

In some implementations, determining the one or more suggested action elements can include displaying textual content descriptive of at least a portion of audio data within the lock screen interface. As a more particular example, the sensor data captured by the mobile computing system can include image data and audio data including speech from the user. The mobile computing system can determine the one or more suggested action elements, and can also display textual content descriptive of at least a portion of the audio data. For example, the mobile computing system can display a transcription of at least a portion of the audio data within the lock screen interface. In some implementations, the transcription can be displayed in real-time within the lock screen interface for as long as the input collection element is selected by the user.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for contextualized input collection and intent determination for mobile devices, comprising:
   providing, by a mobile computing system comprising one or more computing devices, a lock screen interface associated with the mobile computing system, wherein the lock screen interface comprises an input collection element configured to cause capture of sensor data while selected;
   obtaining, by the mobile computing system from a user of the mobile computing system, an input signal that selects the input collection element;
   in response to obtaining the input signal, capturing, by a plurality of sensors of the mobile computing system, the sensor data, wherein the plurality of sensors include an audio sensor and one or both of a front image sensor or a rear image sensor;
   determining, by the mobile computing system based at least in part on content of the sensor data captured by the plurality of sensors including the audio sensor and the one or both of the front image sensor or the rear image sensor, one or more suggested action elements from a plurality of predefined action elements, wherein the one or more suggested action elements are respectively indicative of one or more device actions; and
   providing for display, by the mobile computing system at a display device associated with the mobile computing system, the one or more suggested action elements within the lock screen interface.

2. The computer-implemented method of claim 1, wherein the method further comprises:
   obtaining, by the mobile computing system from the user of the mobile computing system, an input signal that selects a suggested action element of the one or more suggested action elements.

3. The computer-implemented method of claim 2, wherein the method further comprises performing, by the mobile computing system, the device action indicated by the suggested action element.

4. The computer-implemented method of claim 2, wherein determining the one or more suggested action elements comprises:
   processing, by the mobile computing system, the sensor data with a machine-learned action determination model to determine the one or more suggested action elements from the plurality of predefined action elements.

5. The computer-implemented method of claim 4, wherein:
   the machine-learned action determination model is trained based at least in part on data associated with the user; and
   wherein the method further comprises adjusting, by the mobile computing system, one or more parameters of the machine-learned action determination model based at least in part on the suggested action element.

6. The computer-implemented method of claim 1, wherein:
   the sensor data comprises image data depicting one or more objects from one or more of the front image sensor or the rear image sensor; and
   the one or more suggested action elements are based at least in part on the one or more objects.

7. The computer-implemented method of claim 6, wherein:
   the display device associated with the mobile computing system comprises a touchscreen display;
   the input collection element comprises a touch element; and
   the input collection element comprises an authentication element configured to evaluate a fingerprint of the user.

8. The computer-implemented method of claim 1, wherein:
the sensor data comprises image data from one or more of the front image sensor or the rear image sensor;
the input signal that selects the input collection element comprises a touch gesture that is performed at the input collection element for a period of time; and
wherein the sensor data is captured for at least the period of time.

9. The computer-implemented method of claim 1, wherein:
the sensor data comprises audio data from the audio sensor; and
wherein determining the one or more suggested action elements respectively indicative of the one or more device actions further comprises providing for display, by the mobile computing system within the lock screen interface, textual content descriptive of at least a portion of the audio data.

10. The computer-implemented method of claim 1, wherein the input signal that selects the input collection element comprises one or more of:
a touch gesture at the location of the input collection element at the display associated with the mobile computing system;
a voice command;
a hand gesture performed by the user; or
a motion of the mobile computing system performed by the user.

11. The computer-implemented method of claim 1, wherein the one or more device actions comprise one or more of:
storing at least a portion of the sensor data;
deleting at least a portion of the sensor data;
displaying at least a portion of the sensor data;
providing the sensor data to an application;
opening the application; or
generating instructions for one or more applications.

12. The computer-implemented method of claim 1, wherein:
prior to obtaining the input signal that selects the input collection element, the method comprises capturing preliminary image data by the front image sensor or the rear image sensor; and
wherein the input collection element comprises at least a portion of the preliminary image data.

13. The computer-implemented method of claim 1, wherein:
prior to obtaining the input signal that selects the input collection element, the method comprises capturing preliminary sensor data by the plurality of sensors for a period of time; and
appending, by the mobile computing system, the preliminary sensor data to the sensor data captured in response to obtaining input signal.

14. The computer-implemented method of claim 1, wherein:
the sensor data further comprises geolocation data and the plurality of sensors further comprises a location sensor; and
the sensor data further comprises accelerometer data and the plurality of sensors further comprises an accelerometer.

15. A mobile computing system, comprising:
one or more processors;
a plurality of sensors, including:
one or more image sensors comprising one or more of a front image sensor, a rear image sensor, or a peripheral image sensor; and
an audio sensor;
a display device; and
one or more tangible, non-transitory, computer readable media that collectively store instructions that when executed by the one or more processors cause the one or more processors to perform operations, the operations comprising:
providing a lock screen interface associated with the mobile computing system, wherein the lock screen interface comprises an input collection element configured to cause capture of sensor data while selected;
obtaining, from a user of the mobile computing system, an input signal that selects the input collection element;
in response to obtaining the input signal, capturing the sensor data by the plurality of sensors including the one or more image sensors and the audio sensor;
determining, based at least in part on content of the sensor data captured by the plurality of sensors including the one or more image sensors and the audio sensor, one or more suggested action elements from a plurality of predefined action elements, wherein the one or more suggested action elements are respectively indicative of one or more device actions; and
providing for display, at the display device, the one or more suggested action elements within the lock screen interface.

16. The mobile computing system of claim 15, wherein the operations further comprise
obtaining, from the user of the mobile computing system, an input signal that selects a suggested action element of the one or more suggested action elements; and
performing the device action indicated by the suggested action element.

17. The mobile computing system of claim 15, wherein determining the one or more suggested action elements comprises:
processing the sensor data with a machine-learned action determination model to determine the one or more suggested action elements from the plurality of predefined action elements.

18. The mobile computing system of claim 17, wherein:
the machine-learned action determination model is trained based at least in part on data associated with the user; and
wherein the operations further comprise adjusting one or more parameters of the machine-learned action determination model based at least in part on the suggested action element.

19. One or more tangible, non-transitory, computer readable media that collectively store instructions that when executed by one or more processors cause the one or more processors to perform operations, the operations comprising:
providing a lock screen interface associated with a mobile computing system, wherein the lock screen interface comprises an input collection element configured to cause capture of sensor data while selected;
obtaining, from a user of the mobile computing system, an input signal that selects the input collection element;

in response to obtaining the input signal, capturing the sensor data from a plurality of sensors of the mobile computing system, wherein the plurality of sensors include an audio sensor and one or both of a front image sensor or a rear image sensor;

determining, by the mobile computing system based at least in part on content of the sensor data captured by the plurality of sensors including the audio sensor and the one or both of the front image sensor or the rear image sensor, one or more suggested action elements from a plurality of predefined action elements, wherein the one or more suggested action elements are respectively indicative of one or more device actions; and providing for display, at a display device associated with the mobile computing system, the one or more suggested action elements within the lock screen interface.

20. The one or more tangible, non-transitory, computer readable media of claim 19, wherein determining the one or more suggested action elements comprises:

processing, by the mobile computing system, the sensor data with a machine-learned action determination model to determine the one or more suggested action elements from the plurality of predefined action elements.

\* \* \* \* \*